US010960977B2

(12) United States Patent
Gauglitz

(10) Patent No.: US 10,960,977 B2
(45) Date of Patent: *Mar. 30, 2021

(54) DRONE BASED SYSTEMS AND METHODOLOGIES FOR CAPTURING IMAGES

(71) Applicant: PICPOCKET LABS, INC., Austin, TX (US)

(72) Inventor: Wolfram K Gauglitz, Austin, TX (US)

(73) Assignee: PicPocket Labs, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,810

(22) Filed: Feb. 25, 2020

(65) Prior Publication Data

US 2020/0189736 A1 Jun. 18, 2020

Related U.S. Application Data

(63) Continuation of application No. 15/537,415, filed as application No. PCT/US2015/066257 on Dec. 17, 2015, now Pat. No. 10,640,208.

(60) Provisional application No. 62/093,063, filed on Dec. 17, 2014.

(51) Int. Cl.
*B64C 39/02* (2006.01)
*G06Q 50/28* (2012.01)
(Continued)

(52) U.S. Cl.
CPC ......... *B64C 39/024* (2013.01); *G05D 1/0016* (2013.01); *G06Q 30/0278* (2013.01);
(Continued)

(58) Field of Classification Search
CPC ........... H02J 7/02; G08G 5/00; G08G 5/0004; G08G 5/0017; G08G 5/0047; G08G 5/0026; G08G 5/0052; G08G 5/0056; G08G 5/0069; G08G 5/0043; G08G 5/003; G08G 5/006; G08G 5/0095; B60W 10/00; B60W 10/04; B60W 10/08; B60W 2550/00; B60W 2550/40; B60W 2550/402; B60W 2550/404; B60W 2550/406; B60R 1/00; B60R 1/062; B60L 2200/00; B60L 2200/10; G06T 2207/10032; G06T 2207/10016; G06T 2207/20012; G06T 2207/30232; G06T 2207/30244; G06T 5/002; G06K 2209/27; G06K 2209/00201;
(Continued)

(56) References Cited

U.S. PATENT DOCUMENTS 9,513,635 B1 * 12/2016 Bethke et al. ......... G01C 21/12
701/1

* cited by examiner

*Primary Examiner* — Anthony R Jimenez
(74) *Attorney, Agent, or Firm* — Christopher Paradies; Paradies Law P.A.

(57) ABSTRACT

A system is provided for sending a drone to a target on request. The system includes a server provided in communication with a plurality of mobile technology platforms, each of which having an instance of a particular software installed therein. The software contains programming instructions configured to transmit a request from a user for a drone. The system, upon receiving a transmitted request for a drone from one of the plurality of mobile technology platforms, dispatches a drone to fly to a specified target and provides the user with at least partial control of the drone's flight or of media capture by the drone based on the location of the drone relative to a geofence associated with the target.

20 Claims, 2 Drawing Sheets

(51) Int. Cl.
*G06Q 50/10* (2012.01)
*G05D 1/00* (2006.01)
*G06Q 30/02* (2012.01)
*G06Q 50/16* (2012.01)
*H04W 4/021* (2018.01)

(52) U.S. Cl.
CPC ............ *G06Q 50/10* (2013.01); *G06Q 50/16* (2013.01); *G06Q 50/28* (2013.01); *H04W 4/021* (2013.01); *B64C 2201/127* (2013.01)

(58) Field of Classification Search
CPC .... G06K 9/00201; G01C 21/00; B64D 47/08; B64C 39/024; B64C 2201/12; B64C 2201/123; B64C 2201/126; B64C 2201/127; B64C 2201/141; B64C 2201/145; B64C 2201/146; B64C 39/02; H04W 16/00; H04W 16/02; H04W 16/14; H04W 16/18; H04W 16/20; H04W 16/22; H04W 16/24; H04W 4/00; H04W 4/02; H04W 4/021; H04W 4/022; H04W 4/029; G06Q 30/0278; G06Q 50/10; G06Q 50/16; G06Q 50/28; G06Q 50/30; G05D 2201/00; G05D 2201/027; G05D 2201/0209; G05D 2207/0214; G05D 3/00; G05D 1/00; G05D 1/0011; G05D 1/0022; G05D 1/0016; G05D 1/04; G05D 1/0042; G05D 1/0044; G05D 1/0033; G05D 1/0268; G05D 1/0278; G05D 1/0094; G05D 1/101; G05D 1/104
USPC .......................................................... 701/2
See application file for complete search history.

DRONE BASED SYSTEMS AND METHODOLOGIES FOR CAPTURING IMAGES

CROSS-REFERENCE TO RELATED APPLICATION

This application is a continuation of U.S. patent application Ser. No. 15/537,415 filed Jun. 17, 2017 which claims the benefit of priority from PCT/US15/66257, filed Dec. 17, 2015, having the same title and inventor, and which is incorporated herein by reference in its entirety, which claims the benefit of priority from U.S. Provisional Patent Application No. 62/093,063, filed Dec. 17, 2014, having the same title, and having the same inventor, and which is incorporated herein by reference in its entirety.

FIELD OF THE DISCLOSURE

The present disclosure relates generally to systems and methodologies for image capture, and more particularly to drone based systems and methodologies for image capture.

BACKGROUND OF THE DISCLOSURE

The use of drones for capturing images and videos is well established. Drones have a long legacy in military surveillance, and have more recently become more commonplace in civilian applications as well. For example, the International Business Times published an article on Jul. 8, 2014 entitled "Drone-Filmed Fireworks Videos Capture Stunning Images From Above, Between Explosions", in which it featured aerial images and videos of fireworks displays captured by drones during recent Independence Day celebrations. Similarly, several individuals and organizations, including The Telegraph, have published video footage and photos captured by drones of the new Apple Computer headquarters ("Campus 2") under construction in Cupertino, Calif.

SUMMARY OF THE DISCLOSURE

Figure 1:
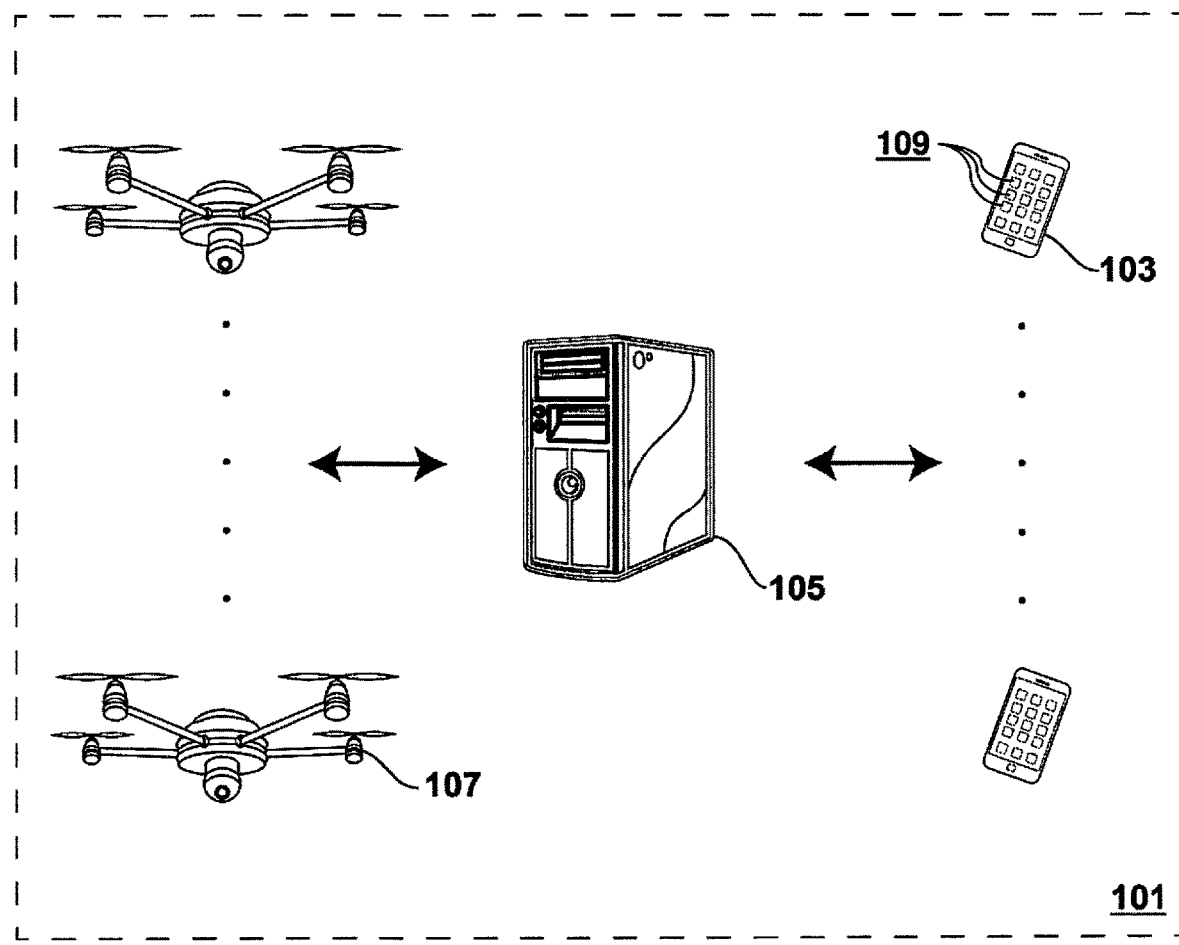
FIG. 1 is an illustration of an embodiment of a system that can be used in association with the methods described herein for providing access to control of drones and/or using drones for the capture of digital media.

In one aspect, a method is provided for sending a drone to a user on request. The method comprises providing software, an instance of which is installed on a plurality of mobile technology platforms, wherein each mobile technology platform is associated with a user and is equipped with a tangible, non-transient medium having an instance of the software installed therein, and wherein the software contains suitable programming instructions. The programming instructions, when executed by a processor, perform the steps of (a) displaying, on a display associated with the mobile technology platform, a graphical user interface (GUI) having a user selectable object displayed thereon, (b) determining when the user selectable object has been selected by the user, and (c) when the user selectable object has been selected by the user, (i) obtaining a target location (such as, for example, the current location of the user as determined, for example, via the location awareness capabilities of the user's mobile technology platform), and (ii) transmitting a request for a drone, wherein the request includes the target location. The method further comprises receiving, from one of the plurality of mobile technology platforms, a transmitted request for a drone, and dispatching a drone to fly over the target location set forth in the request. In a preferred embodiment, the method also includes the step of capturing digital media from the target location from one or more devices disposed on the drone.

In another aspect, a method is provided for requesting digital media capture by a drone. The method comprises obtaining a mobile technology platform equipped with a display and having a tangible, non-transient medium with an instance of a software program installed therein. The software program contains suitable programming instructions which, when executed by a processor, perform the steps of (a) displaying, on the display, a graphical user interface (GUI) having a user selectable object displayed thereon, wherein the GUI includes a digital media control panel that allows the user to input digital media capture control commands from the mobile technology platform to the drone, (b) determining when the user selectable object has been selected by the user, and (c) when the user selectable object has been selected by the user, (i) obtaining a target location (such as, for example, the current location of the user as determined, for example, via the location awareness capabilities of the user's mobile technology platform), and (ii) transmitting a request for a drone, wherein the request includes the target location. The method further comprises selecting the selectable object, and inputting digital media capture control commands into the digital media control panel.

In a further aspect, a system is provided for capturing digital media. The system comprises a fleet of drones, each of which, in the preferred embodiment, is preferably equipped to capture digital media related to a ground based target. The system further comprises a plurality of mobile technology platforms, each of which is equipped with (a) location awareness functionality, (b) a display, (c) a tangible, non-transient memory medium, and (d) an instance of a software program recorded in the memory medium. The software program contains suitable programming instructions which, when executed by a processor associated with the mobile technology platform, render on the display a graphic user interface (GUI) having a graphical object thereon which, when selected by the user, (i) determines the current location of the user via the location awareness functionality, and (ii) transmits a request for a drone, said request including the determined current location of the user. The system further comprises a controller which receives requests for drones from the plurality of mobile technology platforms and directs a drone from the fleet of drones to the determined current location of the user.

In still another aspect, a method is provided for performing an appraisal on an asset. The method comprises (a) providing a drone equipped with image capture and location awareness functionalities; (b) obtaining a set of comparable assets to be used as a basis for establishing the appraisal value of the asset; (c) repeating, until n images have been captured, where $n \geq 1$, the steps of (i) transmitting to the drone a request to capture an image of a target asset selected from the group consisting of the asset and the comparable assets, (ii) determining the current location of the drone with respect to a geofence associated with the target asset, and (iii) if the drone is within a distance d of the geofence associated with the target asset, then capturing the image, and otherwise denying the request; and (d) using the n images to determine an appraisal value of the asset.

In a further aspect, a method is provided for capturing images of an asset. The method comprises (a) providing a drone which is equipped with image capturing and location awareness functionalities; (b) receiving, from the drone, a request to capture an image of the asset using the software; (c) determining the current location of the drone with respect to a geofence associated with the asset; and (d) if the drone is within a distance d of the geofence associated with the asset, then granting the request, and otherwise denying the request.

DETAILED DESCRIPTION

Despite the aforementioned advances, several needs still exist in the art for the application of drone based imaging and, more generally, drone based capture of digital media. For example, in some applications, there is a need in the art to obtain, on demand, the drone based capture of digital media pertaining to a target of interest, such as a location or an event. There is further a need in the art for a means by which a party requesting drone based capture of digital media can control at least certain parameters of the digital media capture, and can define the target of the digital media capture. These and other needs may be met with the systems and methodologies disclosed herein.

The systems, devices and methodologies disclosed herein may be further understood with reference to the particular, non-limiting embodiment depicted in FIG. 1 of a system for summoning a drone for digital media capture. With reference thereto, a system 101 is provided which includes a plurality of mobile technology platforms 103, a server 105 and a fleet of drones 107. Each of the plurality of mobile technology platforms 103 has an internal memory device with an instance of a software application recorded therein.

The software application is preferably equipped with suitable features to allow the user to capture digital media such as, for example, photos, videos and sound files. In a preferred embodiment, and in addition to the features and functionalities described herein, the software includes the features and functionality of the software described U.S. 2013/0275505 (Gauglitz et al.), entitled "Systems and Methods for Event Networking and Media Sharing", U.S. 20130117146 (Gauglitz), entitled "System and Methods for Event Networking, Media Sharing, and Product Creation", and U.S. 62/048,506, entitled "Systems And Methodologies For Validating The Correspondence Between An Image And An Asset", all of which are incorporated herein by reference in their entirety. The software may be implemented in various forms including, for example, as a distributed application, or as a client-server application.

In a preferred embodiment, the software, when launched on a mobile technology platform on which an instance of the software is installed, renders a suitable graphical object on the display of the host device. This object may be, for example, an icon, a button, a tab, a picture, or any other suitable, user-selectable object, although in an especially preferred embodiment, it is an icon with the associated text field "Drone Me!" The object is preferably incorporated into the graphical user interface (GUI) of image, video and/or audio capture software installed on the host device, to provide the user with a further option for capturing those types of media.

In a preferred embodiment, selection of the graphical object by the user causes the transmission of a drone request to the server 105. This request preferably includes the current location of the user as may be determined, for example, by native location awareness software installed on the host device or by other suitable means.

Upon receipt of a drone request, the server 105 utilizes a suitable algorithm to determine which drone, in the fleet of drones 107, to dispatch to the user's location. Various factors may be considered in this determination including, for example, the availability of a given drone, the current location of the drone with respect to the target, the flight path required for a drone to travel from its current location to the target, the length of such flight path and the time required for the drone to traverse it, atmospheric conditions (including, for example, wind speed and wind direction), and other such factors.

In a preferred embodiment, the software, when launched on a mobile technology platform on which an instance of the software is installed, renders a suitable graphical object 109 on the display of the mobile technology platform or host device 103. This object may be, for example, an icon, a button, a tab, a picture, or any other suitable, user-selectable object, although in an especially preferred embodiment, it is an icon with the associated text field "Drone Me!" The object 109 is preferably incorporated into the graphical user interface (GUI) of image, video and/or audio capture software installed on the host device 103, to provide the user with a further option for capturing those types of media.

In a preferred embodiment, selection of the graphical object 109 by the user causes the transmission of a drone request to the server 105. This request preferably includes the current location of the user as may be determined, for example, by native location awareness software installed on the mobile technology platform or host device 103 or by other suitable means.

For example, in some embodiments of the systems and methodologies disclosed herein, upon approaching the target location, the drone may allow the user of the mobile technology platform to assume at least partial control over the capture of digital media by the drone. In such embodiments, the GUI may include a digital media control panel that allows the user to input digital media capture control commands from the mobile technology platform to the drone. These digital media capture control commands may include, for example, commands which specify the type of digital media to be captured by the drone, when or how frequently such digital media is to be captured, the location of a target to be imaged, a set of coordinates or geofence (which may be a user defined geofence) which specifies the location of the target, the shutter speed or exposure settings to be used by a drone camera in acquiring images or video footage, the lens or camera to be used during imaging (this may be an actual lens, or a virtual lens which produces a desired optical effect), or target information obtained, for example, from a target painter, which may be associated with the user and, in some embodiments, may be incorporated into the mobile technology platform.

In some embodiments of the systems and methodologies disclosed herein, upon approaching the target location, the drone may allow the user of the mobile technology platform to assume at least partial control over the flight of the drone, especially when it is approaching sufficient proximity to the target location to allow for the capture of digital media. In such embodiments, the GUI may be equipped with a flight control panel that allows the user to input flight control commands from the mobile technology platform to the drone. These flight control commands include commands which specify a portion of the flight path to be taken by the drone during digital media capture. In some embodiments, the GUI may also be configured to allow the user to enter or adjust other flight control parameters, such as the altitude, speed or trajectory of the drone. For safety or security reasons, the drone may be equipped with a database of allowable commands, such that any flight control command input by the user which is not an allowable command or would put the drone or members of the public in peril may be disregarded by the drone.

As an example of the foregoing, in some embodiments, a fleet of drones may be made available at an event venue. Attendees at the event may be given the ability to assume control over a particular drone in the fleet for a period of time. This may occur as a result of the attendee purchasing drone time, receiving it as a complimentary gift, or by other means. During the time that the attendee has control over the drone, the user may utilize the drone to capture digital media of the event, and the digital media may be associated with the user and/or event in the manner described, for example, in U.S. 62/048,506 (Gauglitz), entitled "Systems And Methodologies For Validating The Correspondence Between An Image And An Asset", and in PCT/US15/49488, which has the same inventor and title. The user may have only partial control over the drone during this time. For example, the user may be able to control certain parameters of the drone's flight path, but may be locked out of adjusting the altitude of the drone. When the drone is not being utilized by an attendee, it may return to a home, base for refueling or recharging, or may hover over the event until another attendee takes control over it. In this way, control of the drone may be essentially passed off from one attendee to another.

In some embodiments of the systems and methodologies defined herein, a drone may be equipped with suitable intelligence so that it can determine the most efficient flight path to canvas an event (for example, for digital media capture purposes). This may occur through software and/or hardware installed on the drone itself, and/or through suitable communications between the drone and one or more computers or computer networks. This intelligence may be adapted to permit the drone to recalculate its flight path due to detours or interruptions (as may occur, for example, if an individual temporarily assumes control over the drone in the manner described herein).

Figure 2:
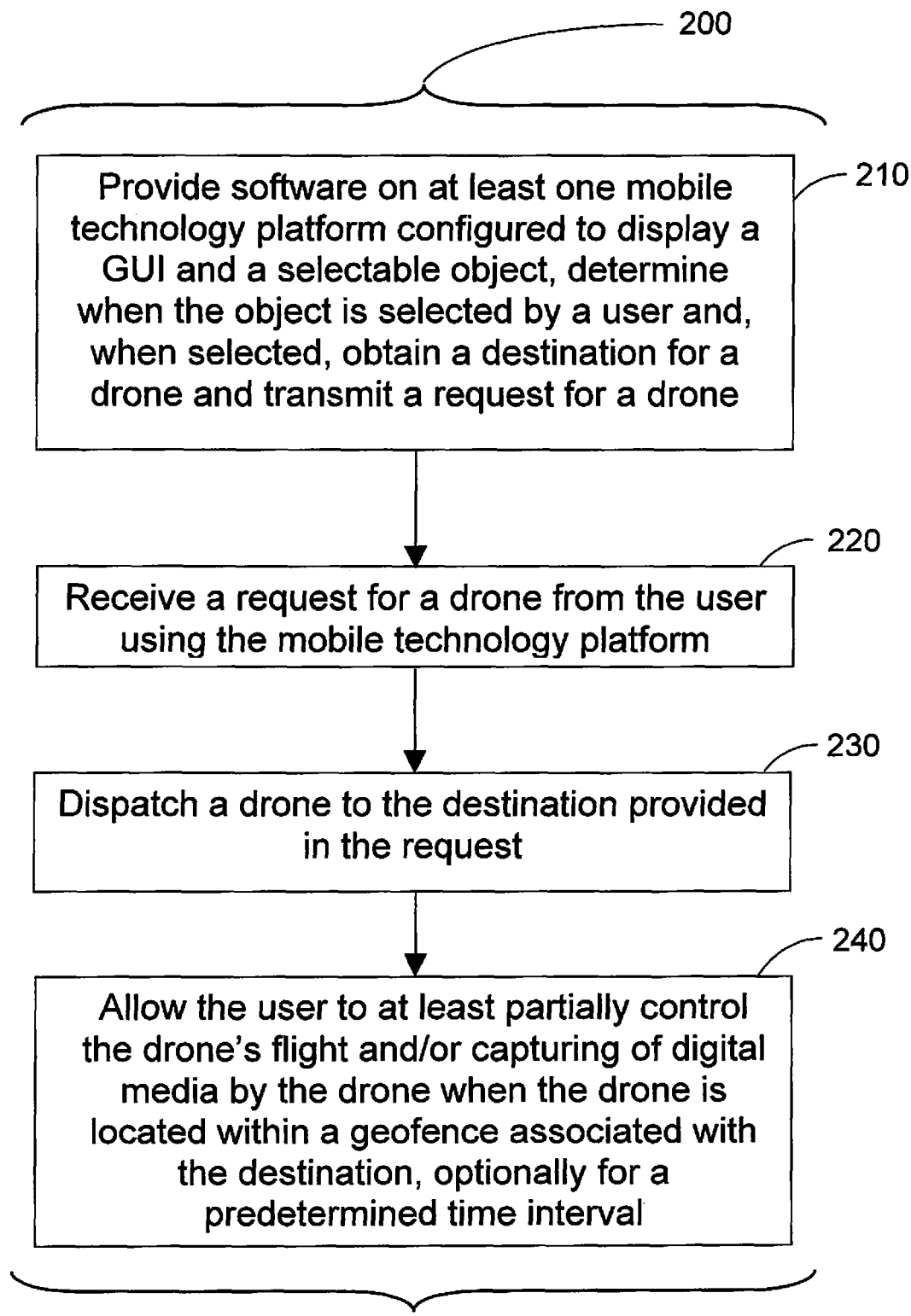
FIG. 2 is a flowchart illustrating a method for providing access to and/or controlling drones in accordance with exemplary embodiments of the present disclosure.

FIG. 2 illustrates an exemplary flowchart 200 of a method in accordance with embodiments of the present disclosure. In step 210, software is provided on at least one mobile technology platform that is configured to display a GUI and a user selectable object; determine when the object is selected by a user and, when selected; obtain a destination for a drone; and transmit a request for a drone (e.g., to a server 105). The exemplary method then includes receiving a request for a drone from the user using the mobile technology platform, which can include a destination for the drone as described herein, as shown in step 220. In step 230, a drone 107 is then dispatched to the destination provided in or identified with the request. Finally, in step 240, the user is then allowed to at least partially control the flight of the drone 107 (e.g., flight path, altitude, orientation, etc. as described herein) and/or the capturing of digital media (e.g., video, static images, and/or audio) by the drone 107 when the dispatched drone 107 is within a geofence associated with the destination. Optionally, such control may be provided for a predetermined time period, which can allow sequential sharing of control of a drone among different users as described herein.

In some embodiments, the systems and methodologies disclosed herein may allow the user to enter information which specifies the general purpose for which use of the drone is being requested. This information may then be utilized to adjust various parameters controlling the drone to settings that are likely to be most conducive to the end use. For example, if the drone is to be used for capturing images or video of real estate, the drone may adopt one or more predefined flight patterns about a location or geofence that are most likely to result in quality image or video capture.

The systems and methodologies disclosed herein may be utilized in combination with other systems and methodologies which include the capture of digital media as a step thereof, with understandable modifications made to account for the use of a drone in capturing the digital media. For example, these systems and methodologies may be utilized as a component of the systems and methodologies disclosed in U.S. 62/048,506 (Gauglitz), entitled "Systems And Methodologies For Validating The Correspondence Between An Image And An Asset", and in PCT/US15/49488, which has the same inventor and title. The '506 application and the '488 application disclose systems and methodologies for ensuring that an image captured of an asset (such as a home) correspond to the actual asset, and are of recent vintage. The systems, methodologies and software disclosed therein for accomplishing this objective may be extended in a straight forward manner to the use of drones in capturing the images of an asset.

By way of illustration, a first entity requiring recent images of a series of properties (for insurance purposes, for example) may contact a second entity which has contracted with the first entity to provide such images upon demand. The second entity may own or rent a fleet of drones, or may have a business relationship with another party that does so. Upon receipt of the imaging request, the second entity may dispatch one or more drones to the location (or locations) of the property (or properties) to be imaged.

The drones in such an embodiment (or a device controlling them) may be equipped with suitable software that prevents the acquisition of digital media until the drone is in sufficient proximity of a target asset. Such proximity may be determined, for example, by ascertaining the proximity of the drone to a geofence associated with the asset. In particular, digital media capture by the drone may be prevented by such software until the drone has entered a geofence associated with the target asset.

In other embodiments, the digital media may be captured by the drone, and then subject to validation later for possible association with an asset. In such an embodiment, temporal and locative data associated with the captured digital media may be used in determining whether the digital media should be associated with a target asset. In some embodiments, the identification of the drone that captured the digital media may be embedded in metadata or other data associated with the captured media.

In some embodiments, one or more beacons may be disposed at, or in proximity to, a target for the purposes of establishing a geofence which may be used, for example, to determine where digital media should be collected by a drone (e.g., through geofence entry). By way of example, if images are desired of the outer structure immediately adjacent to a particular room in a house (for example, to determine the extent of structural damages for insurance purposes), a beacon may be placed in the room and used to define a suitable geofence so that the drone will focus its imaging efforts on the appropriate portion of a house.

In some embodiments, suitable software may be provided to control the collection of digital media by a drone in accordance with a predetermined formula. Such software may be disposed on a drone itself or on another device such as, for example, a mobile technology platform, computer, server or other suitable device which is in communication with the drone and which exerts at least partial control over the drone's flight path.

For example, when a drone is utilized to image houses, such software may determine a set of optimal locations (e.g., sets of 2-dimensional or 3-dimensional coordinates) at which images are to be captured, the optimal attitude (e.g., pitch, yaw and roll) of the drone for each image, and the most efficient flight path for the drone to follow so as to collect the images in the least amount of time or with the least expenditure of energy. The foregoing may depend on such factors as, for example, current weather conditions (such as, for example, wind speed and direction), the location of the sun, and the degree of clarity. The drone may then follow the prescribed flight path and capture images at the predetermined locations.

Of course, it will be appreciated that the foregoing method may be utilized to capture images of a set of assets. In such an embodiment, the software may determine the optimal overall flight path for the drone to be able to capture images of all of the assets subject to appropriate constraints such as, for example, available fuel, time, and consideration of restricted air space.

In some embodiments, a database of parameters (such as coordinates for imaging locations relative to a structure) may be maintained for houses or other structures of various sizes, number of levels, shapes and footprints. These parameters may then be utilized to control image capture.

The systems, methodologies and software applications described herein may also be extended in a straight forward manner to the systems, methodologies and software applications described in U.S. 2013/0275505 (Gauglitz et al.), entitled "Systems and Methods for Event Networking and Media Sharing", U.S. 20130117146 (Gauglitz), entitled "System and Methods for Event Networking, Media Sharing, and Product Creation". For example, the media sharing software disclosed therein may be modified to include the "Drone Me" functionality described herein, thus allowing a spectator, participant or attendee at an event to have an aerial image or video captured of them.

In other embodiments, the software installed on a mobile technology platform associated with a spectator, participant or attendee at an event may be utilized in the manner described herein to at least partially control the flight or imaging capture of a drone. In such embodiments, a party may supply one or more drones for an event, and a spectator at the event who is equipped with a mobile technology platform having the foregoing software installed thereon may "rent" control of the drone for a predetermined period of time through submission of a request through the software.

While the above systems, methodologies and software have frequently been described specifically with respect to the capture of images of particular types of assets (such as, for example, houses or other assets), it will be appreciated that these systems, methodologies and software are more generally applicable to the collection of various types of digital media pertaining to various types of assets.

It will be appreciated that the systems and methodologies disclosed herein extend beyond media capture. For example, these systems and methodologies may be utilized in the context of drone rentals, where a user may summon a drone for a variety of purposes. For example, in some embodiments of the systems and methodologies disclosed herein, a fleet of drones may be equipped with suitable lighting, electronic signage, or audio transmission capabilities, and a user may summon a drone to display advertising, messages, or other content to an audience. For example, a user may summon a drone to pass over a birthday party while displaying "Happy Birthday!" and playing suitable music. In other embodiments, a user may summon a drone, and utilize it to deliver a package or item to a recipient. In still other embodiments, a user may summon a drone for emergency purposes such as, for example, locating a skier in an avalanche.

In some embodiments of the systems and methodologies disclosed herein, multiple drones may be summoned to a crowded venue. In such instances, the drones may communicate with each other for collision avoidance purposes, and to plot flight paths for each individual drone that will prevent or reduce any interference from any of the other drones during media capture.

In some embodiments of the systems and methodologies disclosed herein, a request for a drone may include the selection of one or more parameters for the flight path of a drone. For example, a user may be able to select parameters that will cause a drone to hover or circle and indicated area or point for a predetermined amount of time. A user may also be able to select parameters that will cause a drone to operate in stealth mode. In such embodiments, the drone may operate in response to such a request by reducing or minimizing operational noise or by selecting a flight path that will cause the drone to be as unobtrusive as possible.

In some embodiments of the systems and methodologies disclosed herein, when a drone arrives at a destination, it may follow a user. This may be achieved, for example, by having a mobile technology platform associated with the user update its location periodically, and provide that updated information to the drone (this may occur through direct communication between the mobile technology platform and the drone, or indirectly by way of, for example, one or more servers).

Various mobile technology platforms may be utilized in the systems and methodologies disclosed herein. Preferably, these mobile technology platforms are hand-held devices such as smartphones which are equipped with a display, an operating system, a communications system and location awareness. Many current models of such devices weigh less than 6.5 ounces. However, it is to be understood that other similar devices may be used in some embodiments of the systems and methodologies described herein including, for example, laptop or tablet PCs.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, it will be appreciated that the limitations set forth in any claim may be combined with the limitations set forth in any other claim (or claims) without departing from the scope of the present invention, unless the current specification specifically teaches otherwise. Thus, for example, the various limitations set forth in any dependent claim may be combined with the limitations set forth in any other dependent claim, whether or not such combination is explicitly called out in the present claims or specification.

What is claimed is:

1. A system for sending a drone to a target location on request, comprising:
   a plurality of mobile technology platforms, wherein each mobile technology platform comprises a processor and a tangible, non-transient computer-readable medium having an instance of a software program installed therein, and wherein the software program contains programming instructions which, when executed by the processor, perform the steps of:
   (a) displaying, on a display associated with the mobile technology platform, a graphical user interface (GUI) having a user selectable object displayed thereon,
   (b) determining when the user selectable object has been selected by a user, and
   (c) when the user selectable object has been selected by the user, (i) obtaining the target location for the drone, and (ii) transmitting a request for the drone, wherein the request includes the target location; and
   a server provided in communication with the plurality of mobile technology platforms and with the drone, wherein the server is configured to:
   (a) receive, from at least one of the plurality of mobile technology platforms, the transmitted request for the drone;
   (b) dispatch the drone to fly to the target location specified in the request; and
   (c) transmit a command to the drone to capture digital media from the target location using a device disposed on the drone;
   wherein the at least one of the mobile technology platforms can at least one of partially control a flight of the drone or partially control the capture of digital media by the drone based on a location of the drone relative to a geofence associated with the target location.

2. The system of claim 1, wherein obtaining the target location for the drone comprises querying the user for the target location.

3. The system of claim 1, wherein the digital media includes at least one digital image.

4. The system of claim 1, wherein the digital media includes at least one digital video.

5. The system of claim 1, wherein the digital media includes at least one audio file.

6. The system of claim 1 wherein, upon the drone entering the geofence, a user of the software program of the mobile technology platform has at least partial control over the capture of digital media by the drone.

7. The system of claim 1, wherein the mobile technology platform transmitting the request for the drone has location determination software.

8. The system of claim 7, wherein obtaining the target location for the drone comprises obtaining the current location of the mobile technology platform transmitting the request for the drone, and specifying the current location of the mobile technology platform as the target location.

9. The system of claim 1 wherein, upon the drone entering the geofence, a user of the software program of the mobile technology platform has at least partial control over the flight of the drone.

10. The system of claim 9, wherein the GUI includes a flight control panel wherein a user can input flight control commands from the mobile technology platform to the drone.

11. The system of claim 10, wherein the drone is equipped with a database of the commands, and wherein any flight control command received from the mobile technology platform which is not a member of the database of the commands is disregarded by the drone.

12. The system of claim 10, wherein said flight control commands include commands that specify a portion of the flight path to be taken by the drone during capture of the digital media.

13. The system of claim 1 wherein, upon the drone entering the geofence associated with the target location, a user of the software program of the mobile technology platform has at least partial control over the capture of digital media by the drone while the drone is within the geofence.

14. The system of claim 13, wherein the GUI includes a digital media control panel wherein a user can input digital media capture control commands from the mobile technology platform to the drone.

15. The system of claim 14, wherein said digital media capture control commands include commands that specify a type of digital media to be captured by the drone.

16. The system of claim 14, wherein said digital media capture control commands include commands which specify when digital media is to be captured by the drone.

17. A system for requesting digital media capture by a drone, comprising:
    a mobile technology platform equipped with a display and having a tangible, non-transient computer-readable medium with an instance of a software program installed therein, wherein the software program contains programming instructions which, when executed by a processor, perform the steps of:
    (a) displaying, on the display, a graphical user interface (GUI) having a user-selectable object displayed thereon, wherein the GUI includes a digital media control panel wherein a user can input digital media capture control commands from the mobile technology platform to the drone,
    (b) determining when the user-selectable object has been selected by the user,
    (c) when the user-selectable object has been selected by the user: (i) obtaining a target location from the mobile technology platform associated with the user, and (ii) transmitting a request for the drone, wherein the request includes the target location, and
    (d) receiving digital media capture control commands via the digital media control panel and transmitting the digital capture commands to the drone;
    wherein a user can input digital media capture control commands to capture digital media when the drone is within a geofence associated with the target location.

18. A system for sending a drone to a destination on request, comprising:
    a plurality of mobile technology platforms, wherein each mobile technology platform is equipped with a tangible, non-transient computer-readable medium having an instance of a software program installed therein, and wherein the software program contains programming instructions which, when executed by a processor, perform the steps of:
    (a) displaying, on a display associated with each mobile technology platform, a graphical user interface (GUI) having a user-selectable object displayed thereon,
    (b) determining when the user-selectable object has been selected by a user, (c) when the user-selectable object has been selected by the user: (i) obtaining a destination for the drone, and (ii) transmitting a request for the drone, wherein the request includes the destination, and
(d) the user having at least partial control of at least one of the drone's flight or capturing of digital media by the drone when the drone is located within a geofence associated with the destination; and a server provided in communication with the plurality of mobile technology platforms and with the drone, wherein the server is configured to:
 (a) receive the transmitted request for the drone, and
 (b) dispatch the drone to fly to the destination specified in the request.

19. The system of claim 18, wherein the destination is a determined location of the mobile technology platform associated with the user.

20. The system of claim 18, wherein the at least partial control of at least one of the drone's flight or capturing of digital media by the drone is provided for a predetermined period of time.

* * * * *